UNITED STATES PATENT OFFICE.

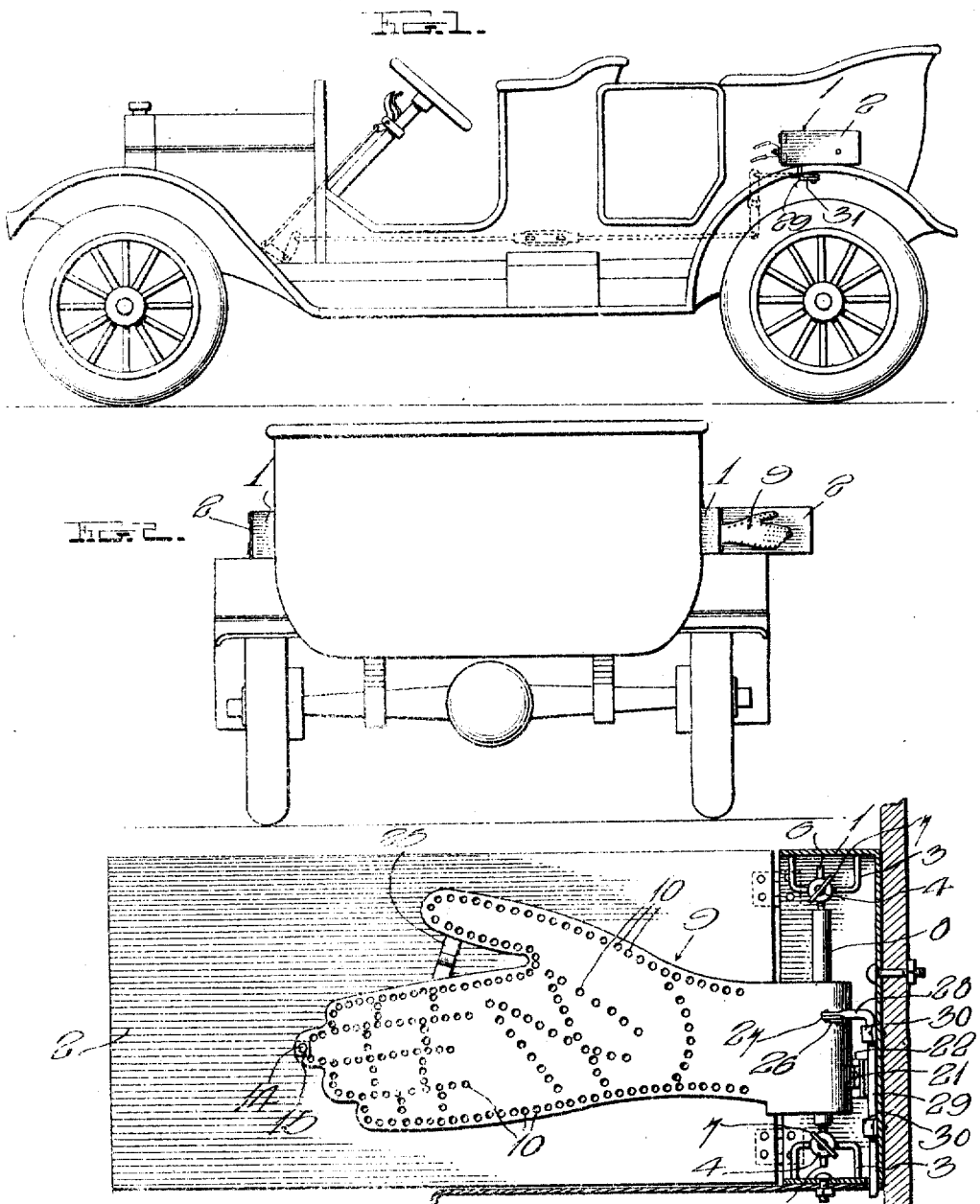

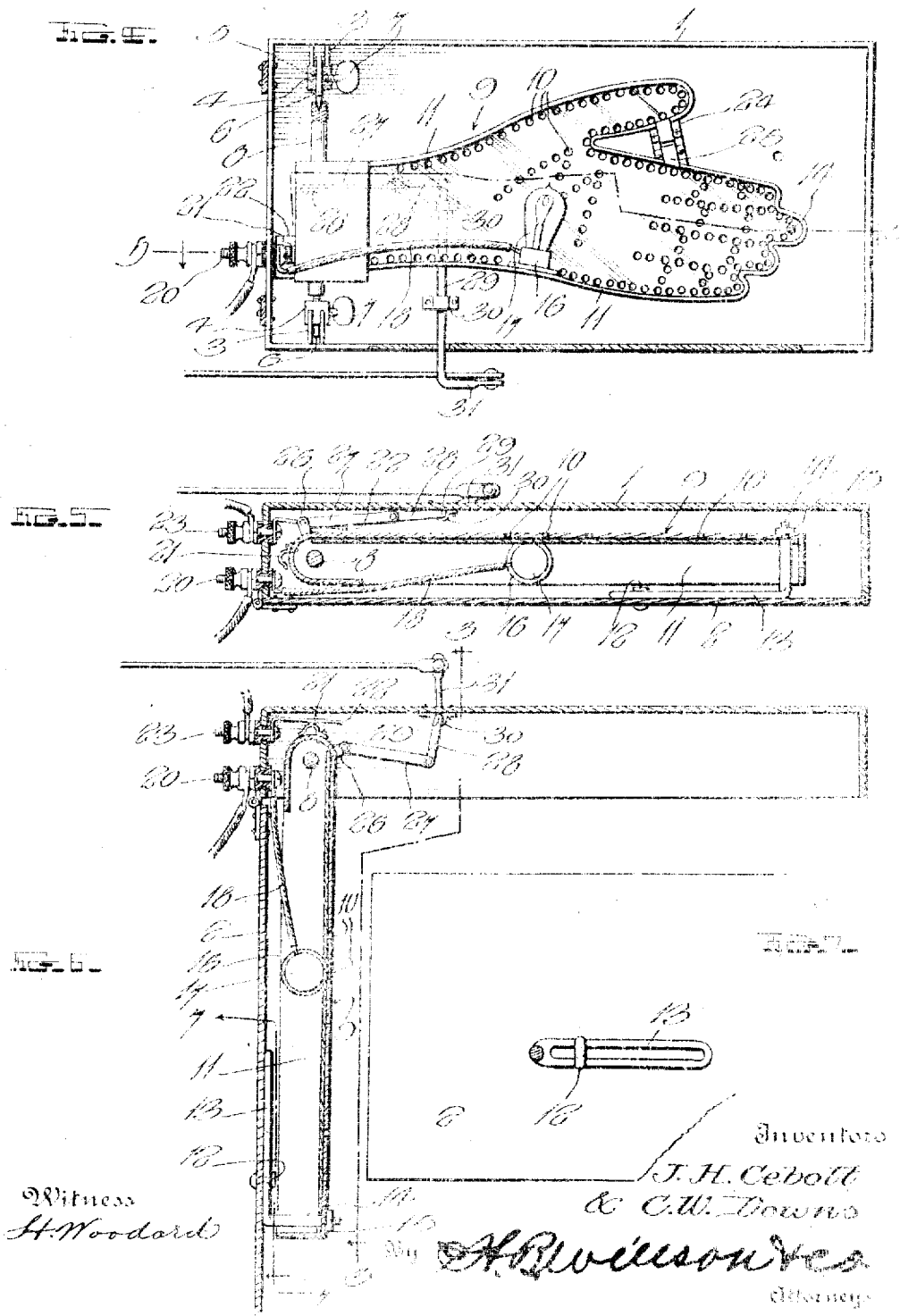

JOHN H. CEBOLT AND CLARENCE W. DOWNS, OF INDIANAPOLIS, INDIANA.

DIRECTION-SIGNAL FOR VEHICLES.

1,240,310.  Specification of Letters Patent.  Patented Sept. 18, 1917.

Application filed April 6, 1916. Serial No. 89,486.

*To all whom it may concern:*

Be it known that we, JOHN H. CEBOLT and CLARENCE W. DOWNS, citizens of the United States, residing at Indianapolis, in the county of Marion and State of Indiana, have invented certain new and useful Improvements in Direction-Signals for Vehicles; and we do declare the following to be a full, clear, and exact description of the invention, such as will enable others skilled in the art to which it appertains to make and use the same.

This invention relates to certain new and useful improvements in direction signals for automobiles and the like.

The primary object of the invention is to provide a simple and effective signal adapted to be applied as a whole to an automobile and capable of adjustment or movement for the purpose of notifying the drivers of other machines, as well as pedestrians, that the machine bearing the signal is about to turn to the right or left, the signal being controlled by the driver of the machine by means of a hand, foot lever, or other similar device disposed within his reach.

Another object of the invention is to provide a signal of this character which can be readily used both day and night, the pointer of the signal containing some suitable means for illuminating the same.

A still further object of the invention is to provide a device of this character which will be simple, strong, durable and inexpensive in construction, efficient and reliable in operation, and well adapted to the purpose for which it is designed.

With these and other objects in view, the invention consists of certain novel features of construction, and the combination and arrangement of parts as will be hereinafter fully described and claimed.

In the accompanying drawings in which similar reference characters designate like parts throughout the several views, Figure 1 is a side elevation of an automobile, showing the application of a device constructed in accordance with this invention thereto;

Fig. 2 is a rear elevation of the same;

Fig. 3 is a sectional view through one of the casings showing the cover and pointer thereof in its open position, said view being taken on the plane of the line 3—3 of Fig. 6;

Fig. 4 is a front elevation of the interior of the casing showing the pointer in elevation in its closed position, the cover of the casing being here shown removed;

Fig. 5 is a horizontal sectional view taken on the plane of the line 5—5 of Fig. 4;

Fig. 6 is a similar view showing the cover and pointer in their open positions; and Fig. 7 is a detail sectional view taken on the plane of the line 7—7 of Fig. 6.

In the embodiment illustrated, the reference numeral 1 designates a rectangular casing, the outer side of which is open and provided with a hinged cover 2. This casing 1 is adapted to be fixed to the side of an automobile or similar motor vehicle, here shown as being secured to the rear mud guard of the same.

Secured to the top and bottom of the casing 1 and at one end thereof, are pairs of spaced yokes 3, between which are mounted brackets 4 having vertically alined openings 5 therein. Adjustably mounted within the openings 5 and in vertical alinement with each other are upper and lower pivot pins 6, the inner ends of which are cone-shaped for a purpose to be hereinafter described. These pins 6 are retained in their adjusted positions by suitable thumb screws 7 which extend through the brackets 4 at right angles to the openings 5, as clearly shown by the drawings.

Revolubly mounted between the cone-shaped ends of the pins 6 is an upright shaft 8, the upper and lower ends of which are provided with cone-shaped recesses to afford this connection. This shaft 8 carries an indicating pointer 9, here shown as conforming in shape to the outline of a hand, and having perforations 10 in its side arranged to represent the veins and joints of the hand. As shown in the drawings, this pointer is provided with laterally extending flanges 11 whereby to form a suitable housing for inclosing a light to be hereinafter described. To prevent dust, rain, etc., from passing through the perforations in the pointer, a transparent pane of any suitable material, preferably of a non-breakable substance is fixed within the interior of the same adjacent the side thereof.

The cover 2 of this improved device is provided with a headed element 12 which is slidably engaged with a slotted plate 13, the latter being secured in any suitable manner to the pointer 9 but preferably by having a threaded shank 14 extending through the side of the pointer and provided with a lock nut 15 on its free end. By this arrangement it may be seen that whenever the pointer is moved to swing out of the casing the cover 2 is opened, and owing to the slidable connection of the pointer with the same, when the pointer is swung again into its normal position the cover is also swung to its normal position. Owing to the fact that the pointer is pivotally mounted within the end of the casing at a point spaced from the pivotal point of the cover, the aforementioned slidable connection is necessary in order that the cover and the pointer may be moved to either opened or closed position together.

Within the pointer 9 and preferably fixed to one of the flanges 11 thereof is a lamp socket 16, in which is secured a small electric lamp 17. A conductor 18 connects one post of the lamp socket with a binding post 20 which extends through the end of the casing, and being insulated therefrom. A contact point 21 of any convenient construction is fixed to the pivoted end of the pointer 9 and grounded thereto. The binding post 20, being insulated from the casing, extends through one end of the same, and is adapted to be connected to one of the lead wires from the battery or other suitable source of electric current carried by the vehicle. Secured to the end of the casing is a resilient strip 22 which is adapted to be brought into engagement with the contact 21 when the pointer 9 is swung out of the casing 1, thereby closing the circuit through the lamp 17, said strip being connected by a binding post 23 which is in turn adapted to be connected to the other lead wire from the battery. By this construction it may be seen that the lamp 17 is only lighted when the pointer is extending out of the casing.

The closed side or inner wall of the casing 1 is provided with a substantially U-shaped clip 24 which is adapted to receive a headed lug 25 carried by the pointer 9, this lug 25 being here shown positioned between the portion comprising the thumb and forefinger of the hand. By this arrangement the pointer and cover are locked in their closed positions.

Extending laterally from the pivoted end of the pointer 9 is an arm 26, to which is pivotally connected one end of a link 27, the other end of which is likewise connected to the laterally bent arm 28 of a rock shaft 29, said rock shaft being mounted in suitable guides 30 in the interior of the casing 1. The outer or lower end of the rock shaft 29 is also provided with a laterally extending arm 31 which is operated by the driver of the vehicle by means of a hand or foot lever disposed within his reach and having connection with the same by a plurality of suitable links and levers, the specific construction of which will vary according to the size and make of the automobile or other vehicle.

Suitable spring means may be employed for automatically closing the pointer and cover, if desired.

In use, one of the above described signals is placed on each side of the automobile or other similar vehicle, and whenever the driver of the same contemplates on turning it to the right or left, he operates the hand or foot lever so as to cause the pointer on the side toward which the machine is to be turned to be swung outwardly out of its respective casing. This, as will be readily understood, is very advantageous since it does not require the driver to remove his hands a considerable distance from the steering wheel, as has heretofore been necessary.

From the foregoing description, taken in connection with the accompanying drawings, the operation of the device will be readily understood without a more extended explanation.

As various minor changes in form and proportion, and in the minor details of construction may be resorted to without departing from the spirit of the invention, we do not wish to be limited to the construction herein shown and described other than that set forth in the appended claims.

We claim:—

1. A device of the class described comprising a casing open on one side, a cover hinged to the open side of said casing, a pointer pivotally mounted within said casing, means for swinging said pointer into and out of said casing, and a sliding connection between said pointer and cover, said cover being continually in engagement with the pointer, whereby the same is opened or closed by operation of said pointer swinging means.

2. A device of the class described comprising a casing open on one side, a cover hinged to the open side of said casing, a pointer pivotally mounted at one of its ends within said casing, a slotted plate fixed to said pointer, a headed element slidably engaged in the slot of said plate and fixed to the said cover, and means for swinging said pointer into and out of said casing.

In testimony whereof we have hereunto set our hands in presence of two subscribing witnesses.

JOHN H. CEBOLT.
CLARENCE W. DOWNS.

Witnesses:
ELMON SARNT,
S. G. BULLUP.